United States Patent Office 2,696,504
Patented Dec. 7, 1954

2,696,504

POLYAMINOPOLYUREAS

Robert S. Yost, Oreland, and Robert W. Auten, Jenkintown, Pa., assignors to Rohm & Haas Company, Philadelphia, Pa., a corporation of Delaware No Drawing. Application July 12, 1952,
Serial No. 298,622

12 Claims. (Cl. 260—553)

This invention deals with ureido-substituted polyamines, or polyureas which contain a multiplicity of ureido groups carried as groups attached to an aliphatic chain, rather than as links in a chain. This invention also relates to a process for preparing these compounds. These polyureidopolyamines are reactive and basic. They are useful as coreactants for preparing condensates from urea and formaldehyde or from melamine and formaldehyde or from other combinations of methylol-forming, resin-forming materials. As coreactants, these polyureas impart a basicity or cationic nature to the resulting condensates and resins. This property makes such condensates of peculiar value in textile treating and finishing, in paper making, in various types of coatings, and in adhesives.

This application is a continuation-in-part of our application Serial No. 237,664, filed July 19, 1951, now U. S. Patent No. 2,616,874, issued November 4, 1952.

The process of this invention comprises reacting an alkylene polyamine with a dihaloalkane to form a soluble reaction product and reacting this product with urea to form the polyureas of this invention.

For the initial step of this process there are reacted an alkylene polyamine and a dihaloalkane. The dihaloalkanes here reacted contain two to three carbon atoms with chlorine or bromine as the preferred halogens. There is thus used 1,2-dichloroethane, 1,2-dibromoethane, 1,2-dichloropropane, 1,2-dibromopropane, or mixed halogen compounds of these types.

The alkylene polyamines here useful contain alkylene chains of two to three carbon atoms, there being preferably two carbon atoms between nitrogen atoms. As starting materials there can be taken ethylenediamine, 1,2-propylenediamine, trimethylenediamine, diethylenetriamine, dipropylenetriamine, triethylenetetramine, N,N'-diaminoethylpropylenediamine, tetraethylenepentamine, and longer chained polyethylenepolyamines. When a polyamine is taken as a starting material with a molecular weight less than about 146, it is necessary to build up the amine of such low molecular size into a larger polyalkylenepolyamine and then condense the resulting polyamine with a dihaloalkane to give a polyamine of sufficient size for conversion to the polyureas of this invention.

While large molecular polyamines may be prepared by starting with amines having a molecular weight as low as 60 and building up larger polyamines as just described, it is often more convenient to start with polyamines having molecular weights from 189 upward. There is no sharp upper limit to the size of polyamine used as reactant. A molecular size of 550 includes, however, most of the species of alkylene polyamines that are available.

Polyamines are often prepared as mixtures, although triethylenetetramine and tetraethylenepentamine have been offered on the market as products boiling over a range of about 30° C. and containing 85% to 95% of a single compound. Higher polyethylenepolyamines are obtained as a residue which it is difficult to fractionate.

For preparation of polyalkylenepolyamines of the molecular sizes giving best results when reacted with a dihaloalkane there may be used the more available amines ethylenediamine, propylenediamine, or diethylenetriamine. One or more of these lower molecular sized polyamines is reacted with one or more of the dihaloalkanes shown above to form a polyalkylenepolyamine hydrohalide, which is reacted with a base such as sodium hydroxide or sodium carbonate to form free polyamines of molecular sizes shown above as most effective starting materials. These are then further condensed with dihaloalkanes to give polyalkylenepolyamines of the sizes required for purposes of this invention to give the desired polyureas.

If it is desired to start with such a relatively small polyamine as ethylenediamine, or the like, there is used 0.25 to 0.75 moles of a dihaloalkane per mole of ethylenediamine, propylenediamine, trimethylenediamine, diethylenetriamine, or mixtures thereof. The reaction is carried out between 70° and 150° C. The direct condensation product is a polyamine hydrohalide, the hydrohalide portion of which is destroyed by reaction with an alkaline reagent. The resulting polyalkylenepolyamine is then ready for reaction with a dihaloalkane, just as triethylenetetramine, tetraethylenepentamine, or other higher polyethylenepolyamine.

Such a polyamine is reacted with a dihaloalkane, preferably in an inert solvent between 70° and 150° C., and if necessary, under pressure. Water or a short chained saturated monohydric alcohol or a mixture of such solvents is particularly useful to provide a solvent medium. About 20% to 60% of the reaction mixture is desirably composed of solvent. The presence of solvent has been found desirable to moderate the reaction and help prevent development of insoluble reaction products.

Preparation of products which are soluble also depends upon the ratio of dihaloalkane to polyalkylenepolyamine. This ratio should here be at least 0.7:1. It may be as high as 1.6:1 when the starting polyamine is triethylenetetramine or the equivalent formed in the preliminary condensation of diamine, for example, and dihaloalkane. The practical upper ratio decreases as the number of amine groups increases. Thus, with tetraethylenepentamine the upper ratio should not be over 1.3:1 and with pentaethylenehexamine not over 1.1:1. For still higher polyethylenepolyamines this ratio should not exceed 1:1. In any case the proportional amounts of dihaloalkane and polyalkylenepolyamine fall within the limits of 0.7:1 and 1.6:1 and are such that they yield a soluble condensate when reacted in solution. The above ratios are by moles.

The condensation of polyalkylenepolyamine and dihaloalkane may be carried out in one step or in a series of steps. If a series of steps is used, the hydrohalide may be destroyed or neutralized at each step, if so desired. In a stepwise procedure the total amount of dihaloalkane which is used may in some cases be somewhat above the 1.6:1 ratio with soluble condensates still resulting.

Under these conditions the condensation products which result reach a molecular range at which the viscosities of their aqueous solutions containing 60% to 65% solids come within the range at 25° C. of G to $Z_3$ on the Gardner-Holdt scale and preferably R to $Z_1$. The reaction is then interrupted. Sufficient alkali may be added here to convert the polyalkylenepolyamine hydrohalide to the free polyalkylenepolyamine. A small excess of alkali does not interfere with subsequent reactions. The resulting salt may be left in the reaction mixture or may be removed, as desired.

In the preferred procedure solvent is stripped off at this point to yield the relatively high molecular, but soluble, polyamine product, which is to be subjected to reaction with urea. It is not, however, essential to strip off solvent at this point, except to ensure that a temperature is reached which is at least sufficient to start the evolution of ammonia after addition of urea. This temperature is usually between 100° and 110° C. If the temperature is carried above this point, solvent may be rapidly taken off and the rate of reaction will increase.

If the hydrohalide is not destroyed by addition of alkali, as shown above, the polyamine hydrohalide may nevertheless be used in the subsequent step of reacting with urea. After reaction with urea any hydrohalide portion left may be reacted with alkali or otherwise taken care of.

Reaction of urea and the large molecular polyalkylenepolyamine built up as above is carried out at temperatures between about 100° C. and 200° C., the temperature being sufficient to cause evolution of ammonia. Urea and said polyalkylenepolyamine are mixed in a ratio determined by —NH— groups in the said polyethylenepolyamine. The ratio of urea to —NH— groups may vary from 0.2:1 to 1.5:1. Preferred ratios are from 0.5:1 to 1.2:1. The mixture is heated. Reaction begins in the range of 100° to 110° C. with evolution of ammonia and increases in rate as the temperature rises. At 160° C. evolution of ammonia is complete in 15 to 20 minutes. Temperatures may be carried up to about 200° C. When water is not present in the reaction mixture, temperatures from 120° to 150° C. are readily attained. If water is present, reaction is generally carried on for a longer time and pressure may become desirable to complete the reaction. The reaction is continued until an aqueous 50% solution (on a solids basis) has a viscosity of about B to M at 25° C. on the Gardner-Holdt scale. For many purposes the reaction is interrupted when a 50% aqueous solution of the polyurea formed reaches a viscosity of C to H. In any case reaction is discontinued before gelation has started so that the reaction product with urea remains fully soluble.

If the reaction product was formed in aqueous solution, it may be retained therein or the solution may be evaporated, particularly under reduced pressure to give a product low in water. The product is useful whether in a water-free form or in solution.

Typical preparations of polyureas of this invention follow. Parts are by weight.

Example 1

There was dissolved 94.5 parts by weight of a tetraethylenepentamine of 88% purity in 80 parts of water. Thereto was added 49.5 parts of ethylene dichloride. The mixture was stirred and heated under reflux for four hours. The pot temperature at this time was 111° C. This reaction mixture had a viscosity of W on the Gardner-Holdt scale at 60% solids. It was diluted with 150 parts of water and treated with 40 parts of solid sodium hydroxide.

The resulting solution containing the above reaction product and sodium chloride was placed in a reaction vessel in the amount of 194.5 parts. This was equivalent to the use of 50 parts of the above reaction product. The reaction vessel was warmed and the water was distilled off under low pressure. To the residue was added 72 parts of urea and the vessel was heated on an oil bath. Ammonia was evolved, absorbed in water, and determined by titration. The temperature at which ammonia evolution began was 114° C. The temperature was gradually raised to 135° C. and held at this level for an hour.

The product thus resulting was a polyurea from the large molecular polyamine. It is useful as a reactant for forming methylol derivatives and N-alkoxymethyl derivatives. It is also useful as a coreactant with urea or melamine and formaldehyde to yield resinous condensates.

Example 2

There were charged to a reaction vessel 1069 parts by weight of ethylene dichloride and 1440 parts of water. The mixture was stirred and thereto was added 1701 parts of tetraethylenepentamine. The heat of solution caused the temperature of the mixture to rise 30° C. The mixture was heated until reflux began, whereupon the heat of reaction maintained the temperature of the reaction mixture at refluxing temperatures for about an hour. The reaction mixture was then heated and stirred until the viscosity of the mixture was X on the Gardner-Holdt scale.

A portion of 318 parts of the reaction mixture was treated with 128 parts of a 50.9% sodium hydroxide solution and 216 parts of urea was then added. This mixture was stirred and heated with water being distilled off under reduced pressure. The temperature was carried to 110° C. under low pressure. Normal pressure was restored and the batch heated at 130°–135° C. for 1.5 hours. The viscosity of a 50% aqueous solution of the resulting product was D on the Gardner-Holdt scale.

Example 3

There were mixed 147 parts by weight of propylene dichloride, 189 parts of tetraethylenepentamine, and 160 parts of water. This mixture was stirred and heated at 120°–130° C. for nine hours in a stainless steel autoclave. During this time the pressure increased from 30 p. s. i. to 160 p. s. i., apparently due to formation of a volatile by-product. The solution of the resulting product was cooled and treated with 220 parts of a 50% caustic soda solution.

There were mixed 155 parts of the above solution and 72 parts of urea. This mixture was heated with stirring under reduced pressure to a temperature of 110° C. after which the residue was heated at 118° to 155° C. until 9.7 parts of ammonia had been given off. The time of heating was one hour and ten minutes.

In this way there was formed a polyureido derivative of the polyamine formed by condensing propylene dichloride and tetraethylenepentamine. This polyurea is useful as a coreactant with urea and formaldehyde to form cationic methylol derivatives which are well absorbed by cellulosic materials.

Example 4

The procedure of Example 3 was followed except that after addition of the 50% sodium hydroxide solution to react with amine hydrochloride the solution was heated under low pressure. Water was thereby distilled off to yield a mixture of salt and polyamino product. This mixture was refluxed with isopropyl alcohol, whereby the polyamino product was dissolved. The alcoholic solution was filtered to separate the salt. The filtrate was subjected to distillation to remove the alcohol.

There was then mixed 50 parts of the resulting residue and 72 parts of urea in 200 parts of water. This reaction mixture was heated to 130° C. for a half hour.

This product was the ureido derivative of the polyamine condensate of propylene dichloride and tetraethylenepentamine.

Example 5

In this example there is illustrated the building up of an amine of considerable size in a series of steps. In the first step diethylenetriamine, which itself does not directly give a polyethylenepolyamine of the size required to yield a final product of full effectiveness in wet strength applications, is used to yield a starting polyamine of the size and type which will yield the preferred high molecular polyamines.

To 18.7 parts of diethylene triamine which had been heated to 105° C. there was slowly added with good agitation 12.6 parts of ethylene dichloride. During this addition the temperature of the reaction mixture was kept at 105°–110° C., cooling being required at first and toward the end of the addition heating being necessary to maintain the desired temperature. When the addition of the above ethylene dichloride was complete, the reaction mixture was heated to 120° C. and held at this temperature until the viscosity of a sample thereof diluted with water in a ratio of 2:1 was between D and E at 25° C. on the Gardner-Holdt scale. The mixture was cooled and treated with 20.4 parts of aqueous 50% sodium hydroxide solution.

The reaction mixture was then heated to 105° C. and 10.8 parts of ethylene dichloride was slowly added with good agitation and with maintenance of temperature between 105°–110° C. The mixture was heated at 112° C. until the reaction mixture from which salt was allowed to settle had a viscosity of W to W+ on the Gardner-Holdt scale. The mixture was cooled to 100° C. and treated with 17.5 parts of aqueous 50% sodium hydroxide solution.

The reaction mixture was again heated to 105°–110° C. and 8.6 parts of ethylene dichloride were gradually added over a 2.5 hour period. The mixture was heated at 112° C. under reflux of water until the viscosity of the reaction mixture from which salt was centrifuged was about X on the Gardner-Holdt scale. The mixture was cooled and treated with 13.9 parts of aqueous 50% sodium hydroxide solution.

In the first step above the molar ratio of diethylenetriamine to ethylene dichloride was 1:0.69. In the second and third steps combined the ratio was 1:1.48. If this ratio is increased to 1:1.6, there results a gel which is still water-soluble, but which is not readily handled in the subsequent operations. Use of still more ethylene dichloride in the above steps leads to a gel which gives entirely unsatisfactory final products.

The polyamine of large molecular size as prepared above was heated under reduced pressure until about half of the water content of the polyamine preparation had been distilled off. The concentrate was then treated with 37.5 parts of urea and heated under reduced pressure until the temperature thereof reached 100° C. at 20 mm. pressure. Heating was continued under normal pressure. Evolution of ammonia began at about 105° C. The temperature of the mixture was raised to 135° C. and held at this level until a sample of the reaction mixture diluted with an equal weight of water gave a viscosity of C on the Gardner-Holdt scale.

The product thus formed is a polyurea. This product is useful as a coreactant with urea and formaldehyde in forming cationic methylol condensates. It is useful, for example, as a reactant which may be added to preformed urea-formaldehyde condensates containing some free formaldehyde, with which it reacts.

*Example 6*

In this example there is shown the conversion of ethylenediamine to a polyethylenepolyamine which is then carried to a large molecular size by further stepwise reaction with ethylene dichloride. The final product resulting after reaction with urea and then reaction with formaldehyde is a satisfactory and useful one for imparting high wet strength to paper.

To 194 parts of ethylenediamine of 93% purity at a temperature of 100° C. there was slowly added 148.5 parts of ethylene dichloride. The temperature during this addition was held between 100° and 110° C. The reaction mixture was then heated to 120° C. and held at this temperature until there was no more refluxing. The mixture was cooled to 90° C. and treated with 240 parts of aqueous 50% sodium hydroxide solution. The product at this point is on average triethylenetetramine.

It was heated to about 100° C. and treated with 118.8 parts of ethylene dichloride while the temperature was maintained between 100° and 110° C. The mixture was heated for an hour at 110° to 112° C. and cooled to 90° C. The polyamine hydrochloride formed in this reaction was treated with 192 parts of aqueous 50% sodium hydroxide solution.

The mixture was again heated to 100°–110° C. and while maintained in this temperature range was slowly reacted with 90.1 parts of ethylene dichloride. The reaction mixture was heated until water was refluxed, cooled to 90° C., and treated with 144 parts of aqueous 50% sodium hydroxide solution.

Again the reaction mixture was heated to 100°–110° C. and now treated with 29.7 parts of ethylene dichloride. The reaction mixture was heated until water was refluxed with the temperature of the mixture at 112° C. The mixture was cooled below 90° C. and treated with 48 parts of aqueous 50% sodium hydroxide solution.

A batch of 590 parts of the above mixture after treatment with sodium hydroxide solution was heated under reduced pressure with removal of about half of the water content. At this point 196 parts of urea were added and heating was continued with removal of the remaining portion of the water content. When the temperature reached 102° C. at 30 mm. pressure, heating was continued at atmospheric pressure. Evolution of ammonia began at 110° C. The batch was heated up to 150° C. and held at this temperature for an hour.

*Example 7*

There were mixed 1945 parts of triethylenetetramine and 264 parts of water and the mixture was stirred and heated to 100° C. Thereto was slowly added ethylene dichloride with the temperature between 100° and 110° C. until 1322 parts had been used. Cooling was necessary during the first part of this addition to control the temperature and toward the end of the addition heating was necessary to maintain the desired temperature level. The reaction mixture was heated at 120° C. until the viscosity of a sample diluted with water in an amount of one third of the weight of the sample was in the range Q to R at 25° C. on the Gardner-Holdt scale.

The reaction mixture was thereupon cooled to about 100° C. and treated with 2120 parts of aqueous 50% sodium hydroxide solution. The mixture was cooled to 70° C. and 750 parts were added of ethylene dichloride. The mixture was heated to refluxing temperatures with the temperature thereof rising over a period of two hours to 112° C., at which temperature the reflux was water. The mixture was heated until the viscosity of a 10 gram sample diluted with 7.5 grams of water was about C on the Gardner-Holdt scale. The reaction mixture was thereupon diluted with 110 parts of water, cooled to 70° C. and treated with 1210 parts of aqueous 50% sodium hydroxide solution.

To this solution was added urea to an amount of 3490 parts. The resulting mixture was heated under reflux, the temperature being about 112° C. Under these conditions ammonia was evolved. Heating was continued until the viscosity of a sample, from which sodium chloride crystals were removed by centrifuging, was W on the Gardner-Holdt scale. Water was then distilled from the reaction mixture until 920 parts had been removed. This product was a concentrate containing the polyurea formed by reaction of urea and the large polyamine condensate.

*Example 8*

There were mixed 292 parts of triethylenetetramine and 36 parts of water. This mixture was stirred and heated and thereto was slowly added 198 parts of ethylene dichloride. The temperature of this reaction mixture was kept at about 100° C. for an hour. The temperature was then raised to 120° C. The mixture was cooled.

A portion of 113.3 parts was taken and treated with 68.4 parts of aqueous 50% sodium hydroxide solution to form free polyamine and sodium chloride. To this slightly alkaline material there was added urea in an amount of 51.3 parts. This mixture was heated under reduced pressure and water was removed therefrom. The residue was heated to 111° C. with evolution of ammonia and gradually to 132° C. over a period of a half hour. There was thus formed the desired polyurea. It was taken up in a little water to give a solution having a total solids content of 81.8% and a polyurea content of 57.1%, this being the polyurea formed by reacting urea and the complex polyalkylenepolyamine formed in the first stage of the reaction.

When a sample of this product is diluted with water to give a solution containing 50% solids and 35% of the polyurea, this solution has a Gardner-Holdt viscosity of B. When it is combined with urea and the mixture is reacted with formaldehyde, there results a methylol condensate which is very effective for increasing the wet strength of paper.

We claim:

1. A process of preparing polyureas which comprises reacting by heating together at 70° to 150° C. a dihaloalkane of not over three carbon atoms having a chain of at least two carbon atoms between the halogen atoms, said halogen being a member of the class consisting of chlorine and bromine, and a polyethylenepolyamine of a molecular weight of at least 146, the mole ratio of dihaloalkane to polyethylenepolyamine being at least 0.7:1 and not exceeding about 1.6:1 and yielding soluble condensation products, continuing reacting same until a 60% to 65% aqueous solution of the condensation products has a Gardner-Holdt viscosity of G to $Z_3$ at 25° C., and reacting said products by heating with urea between 100° and 200° C. until a 50% aqueous solution of the resulting reaction products has a Gardner-Holdt viscosity of about B to M at 25° C., the ratio of urea to —NH— groups of said nitrogenous condensation products being between 0.2:1 and 1.5:1.

2. The process of claim 1 in which the dihaloalkane is 1,2-dichloroethane.

3. The product obtained by the process of claim 1.

4. The product obtained by the process of claim 2.

5. A process of preparing polyureas which comprises reacting by heating together at 70° to 150° C. in the presence of water a dihaloalkane of not over three carbon atoms having a chain of at least two carbon atoms between the halogen atoms, the halogen thereof being a member of the class consisting of chlorine and bromine, and a polyethylenepolyamine having a molecular weight of at least 189, the mole ratio of dihaloalkane to polyethylenepolyamine being at least 0.7:1 and not exceeding 1.3:1 and yielding soluble polyamine hydrohalide condensation products continuing reacting same until a 60% to 65% aqueous solution of the said condensation products has a Gardner-Holdt viscosity of R to $Z_1$ at 25° C., adding a strong inorganic base in an amount to convert said polyamine hydrohalide condensation products to free polyamine condensation products, and reacting them by heating them with urea between 120° and 150° C. until a 50% aqueous solution of the resulting reaction products has a Gardner-Holt viscosity of about C to H at 25° C., the ratio of urea to —NH— groups of said condensation products being between 0.5:1 and 1.2:1.

6. A process according to claim 5 in which the dihaloalkane is 1,2-dichloraethane.

7. The product obtained by the process of claim 5.

8. The product obtained by the process of claim 6.

9. A process for preparing polyureas which comprises reacting together between 70° and 150° C. ethylenediamine and 1,2-dichloroethane in a mole ratio of 1:0.25 to 1:0.75, whereby a polyethylenepolyamine hydrochloride is formed, reacting said hydrochloride with about an equivalent amount of a strong inorganic base whereby polyethylenepolyamine is liberated, reacting said polyethylenepolyamine and 1,2-dichloroethane by heating a mixture thereof in the presence of water at a temperature between 70° and 150° C. until a 60% to 65% aqueous solution of the reaction products has a Gardner-Holdt viscosity of N to $Z_3$ at 25° C., the mole ratio of said dichloroethane to said polyethylenepolyamine being from 0.7 to 1 to about 1.6:1 and yielding soluble condensation products, and reacting said soluble condensation products by heating them with urea between 100° and 200° C. with evolution of ammonia until an aqueous 50% solution of the resulting reaction products has a Gardner-Holdt viscosity of about B to M at 25° C., the ratio of urea used to —NH— groups of said soluble condensation products being between 0.2:1 and 1.5:1.

10. The products obtained by the process of claim 9.

11. A process for preparing polyureas which comprises reacting together between 70° and 150° C. an alkylenediamine having two to three carbon atoms in the alkylene chain thereof and 1,2-dichloroethane in a mole ratio from 1:0.25 to 1:0.75, whereby a polyalkylenepolyamine hydrochloride is formed, reacting said hydrochloride with about an equivalent amount of a base to form polyalkylenepolyamine, reacting said polyalkylene-polyamine and 1,2-dichloroethane by heating a mixture thereof in the presence of water at a temperature between 70° and 150° C. until an aqueous 60% to 65% solution of the reaction products has a Gardner-Holdt viscosity of R to $Z_1$ at 25° C., the mole ratio of said dichloroethane to said polyalkylenepolyamine being from 0.7:1 to 1.3:1 and yielding soluble condensation products, whereby high molecular soluble polyalkylene-polyamine hydrochloride is formed, adding thereto a strong inorganic base in an amount about equivalent to said hydrochloride, whereby free basic polyamine is formed, and reacting said free basic polyamine and urea between about 120° and 150° C. until an aqueous 50% solution of the resulting reaction products has a Gardner-Holdt viscosity of about C to H at 25° C., the ratio of urea being reacted to —NH— groups of said basic polyamine being from 0.5:1 to 1.2:1.

12. The product of the process of claim 11.

References Cited in the file of this patent

UNITED STATES PATENTS

| Number | Name | Date |
|---|---|---|
| 2,145,242 | Arnold | Jan. 31, 1939 |
| 2,366,129 | Rust | Dec. 26, 1944 |
| 2,501,783 | Morgan | Mar. 28, 1950 |

FOREIGN PATENTS

| Number | Country | Date |
|---|---|---|
| 175,675 | Switzerland | May 16, 1935 |
| 614,215 | Great Britain | Dec. 10, 1948 |
| 731,981 | Germany | Feb. 18, 1943 |